Feb. 21, 1933.  O. H. HEINZE  1,898,367

MULTIINDICATING LEVEL

Filed May 29, 1930

INVENTOR,
Oscar H. Heinze,
Louis M. Schmidt

Patented Feb. 21, 1933

1,898,367

UNITED STATES PATENT OFFICE

OSCAR H. HEINZE, OF NEW BRITAIN, CONNECTICUT

MULTIINDICATING LEVEL

Application filed May 29, 1930. Serial No. 457,291.

My invention relates to improvements in multi-indicating level devices of the general form that are used in connection with laboratory instruments, surveying instruments, weighing machines, and the like to determine the proper installation thereof, and the object of my improvement is to produce a multi-indicating level device of relatively diminutive form that is sensitive, is easily read, and simple and economical to manufacture.

In the accompanying drawing:—

Figure 1:
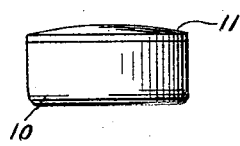
Figure 1 is a side elevation of my improved multi-indicating level device.
Figure 2:
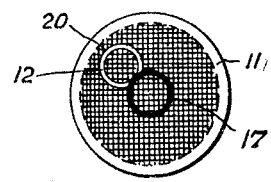
Fig. 2 is a plan view of the same.
Figure 3:
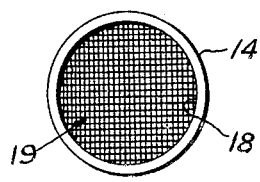
Fig. 3 is a plan view of the cup.
Figure 4:
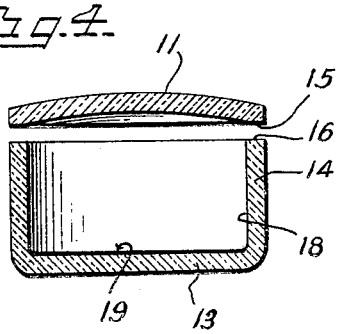
Fig. 4 is a transverse sectional view on an enlarged scale and with the thicknesses of the parts exaggerated, showing the glass top about to be applied to the cup.

My improved multi-indicating level device comprises a cup 10 that serves as the container for the liquid with which the vial structure is charged and a cover 11 of glass of curved form through which the bubble 12 is visible. The structure as a whole is of diminutive character, the overall outside diameter being approximately one-half inch.

The cup 10 comprises the bottom 13 from which rises the cylindrical side wall 14.

The convex cover 11 has a radial flat ground edge portion 15 that is opposed to the ground flat top edge portion 16 of the side wall 14 of the cup, and the edge portions 15 and 16 are held together by means of any siutable form of cement.

Plain alcohol may be used for charging, the filling or charging being such as to provide the bubble 12 in the usual manner. Also, a circular index mark 17 of any desired color may be provided. In use, the structure as a whole may be imbedded in plaster of Paris.

In the present instance the cup 10 is made of white porcelain, with the result that the inside 18 of the side wall 14 is white, and the top or inside 19 of the bottom 13 is coated to produce a dark or black effect. The effect of this combination is to produce as an optical or visible effect a circular border or rim 20 to the bubble 12 that by the contrast with the dark or black background serves to provide a distinctive marking for the bubble.

Herein is found the essence of the present invention.

The dark or black bottom of the cup is generally seen, including part that is enclosed by the reflected white marking ring or rim 20.

Figure 5:
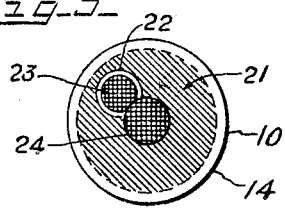
Fig. 5 is a plan view on the same scale as Fig. 2 showing a multi-indicating level device that is charged with a liquid that is colored so as to have generally a greenish yellow color.

In the structure that is shown in Fig. 5 the cup 10 is precisely like the cup 10 of Fig. 1, being made of porcelain and having the inside of the bottom coated dark or brown. The charging liquid, however, is of a character that is well known and in common use in level vials, having a distinctive yellowish green color. The major portion of the space 21 enclosed by the cylindrical side wall 14 is shaded green. The bubble comprises the circle 22 that has the general white appearance of the circle 20 of the bubble 12 and the space 23 enclosed thereby and through which or in which the color effect is dark or black. Thus there is a three color effect in the structure of Fig. 5. The ring or rim 22 may have a greenish tinge that is not in the structure of Fig. 1, but the demarkation is substantially as effective as an indicating means in combination with the fixed index circular mark 24.

I claim as my invention:—

1. In a multi-indicating device, a cup comprising a flat bottom and a cylindrical side wall rising therefrom, a cover cemented to the top of said side wall and having a convex form of glass, said cup being charged with an indicating liquid so as to provide an indicating bubble, said cup being made of white porcelain so as to provide a white face to the inside of said side wall, and the top face of said bottom being coated so as to provide a dark effect.

2. In a multi-indicating device, a cup comprising a flat bottom and a cylindrical side wall rising therefrom, a cover cemented to the top of said side wall and having a convex form of glass, said cup being charged with an indicating liquid so as to provide an indicating bubble, the inside of said cylindrical wall being of a light color, and the top face of said bottom being of a dark color so that under conditions of use there will appear a circular border of a lightish effect as to color such as to enhance the prominence of the bubble as an indicating means.

3. A multi-indicating level device comprising a cup-like container charged with indicating liquid and a cover therefor of glass, said container being in the form of a one-piece structure having a cylindrical form for the side wall and a substantially flat bottom, made of porcelain, and with said bottom provided on the exposed face with a contrasting color or shade relatively to said side wall.

OSCAR H. HEINZE.